March 3, 1964 E. WEINBRENNER ETAL 3,122,785
APPARATUS FOR MAKING CELLULAR PLASTICS
Filed May 14, 1957
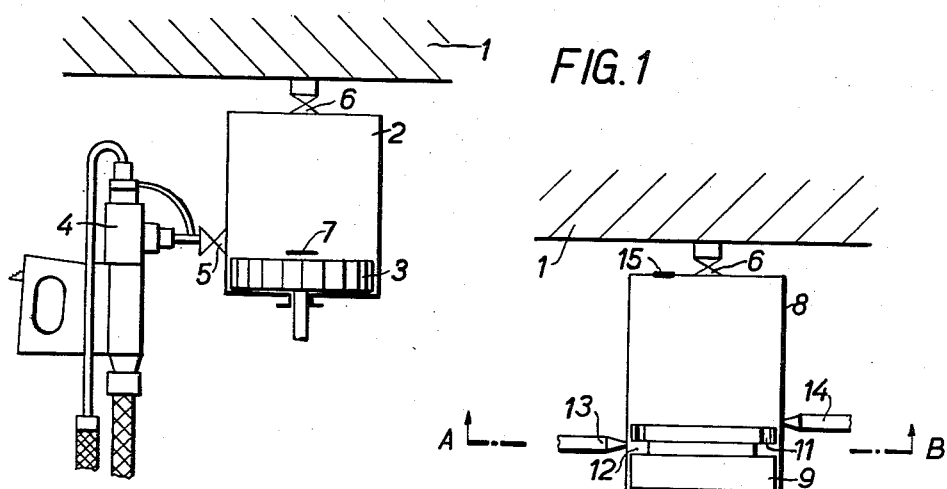
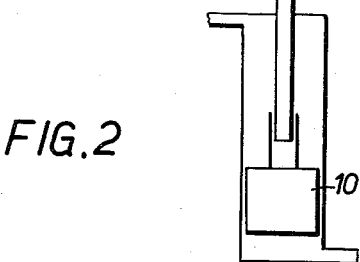
SECTION A-B
INVENTORS
Erwin Weinbrenner, Peter Hoppe, Karl Breer
BY *Clell W. Upchurch*
ATTORNEYS

3,122,785
APPARATUS FOR MAKING CELLULAR PLASTICS
Erwin Weinbrenner, Leverkusen, Peter Hoppe, Troisdorf, and Karl Breer, Cologne-Flittard, Germany, assignors, by mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
Filed May 14, 1957, Ser. No. 659,137
Claims priority, application Germany May 18, 1956
2 Claims. (Cl. 18—5)

This invention relates generally to the manufacture of cellular plastics and, more particularly, to an improved apparatus for making cellular polyurethane plastics and for filling cavities therewith.

Cellular polyurethane plastics may be prepared by reacting an organic compound having at least two reactive hydrogen atoms with a polyisocyanate and then reacting the resulting adduct with water. One process for mixing these components to form a reaction mixture which, upon solidification, results in a cellular polyurethane plastic is disclosed in the Hoppe et al. patent, 2,764,565. In accordance with the process disclosed in this patent, a catalyst or activator and a chain-extender are injected in the organic compound having the reactive hydrogen atoms. Polyisocyanate is also introduced into the mixture either along with the organic compound having the reactive hydrogen atoms or it may be injected separately into the mixture. It is also possible to react the polyisocyanate with the organic compound having the reactive hydrogen atoms in one vessel to form an adduct having the terminal NCO groups and to inject the catalyst or accelerator and water into a stream of the prepolymer. The Hoppe et al. process and apparatus have been found admirably suited for mixing the components of a polyurethane plastic together and for making improved cellular polyurethane plastics, but some difficulty has been experienced when filling molds or hollow objects of relatively large size because the components of the reaction mixture first introduced into the cavity may begin to react chemically before the entire volume of reaction mixture required has been introduced into the cavity. Under such circumstances, the soft cellular product obtained from the reaction is penetrated by the liquid being added. The resulting product frequently contains large voids where the stream of reaction mixture penetrates the partially foamed reaction mixture.

It is therefore an object of this invention to provide an improved apparatus for making cellular polyurethane plastics. Another object of the invention is to provide an apparatus for filling relatively large cavities or molds with cellular polyurethane plastics substantially free from voids. Still another object of the invention is to provide an improved apparatus for mixing together the components of a polyurethane plastic and for transferring the resulting mixture to the place where reaction is to proceed. A further object of the invention is to provide a combination of a mixing apparatus and a reaction chamber which provides for the filling of large cavities with a cellular polyurethane plastic substantially free from voids.

Other objects will become apparent from the following description with reference to the accompanying drawing, in which:

FIGURE 1 is a diagrammatic view of one embodiment of the invention shown in combination with a mixing device which can be used as a hand gun;

FIGURE 2 illustrates another embodiment of the invention in which one vessel is both a mixing chamber and a chamber where partial reaction of the components can be brought about; and FIGURE 3 is a cross section taken along the lines A—B of FIGURE 2.

The foregoing objects of this invention are accomplished, generally speaking, by providing an apparatus having a storage chamber where partial chemical reaction between the chemical components of a cellular polyurethane plastic can proceed and having a means in the chamber for positively ejecting the partially reacted liquid at a predetermined point in the chemical reaction. More specifically, the invention contemplates an apparatus for mixing the components of a polyurethane plastic together and for confining a predetermined volume of the resulting mixture until reaction between the components has proceeded to a predetermined point having a means for ejecting the partially reacted mixture into the mold or cavity where chemical reaction is to go to completion. The apparatus is provided with a temperature responsive actuated piston which ejects the partially reacted components at the proper time. The apparatus is thus composed of a mixing chamber combined with a transition chamber containing a suitable piston or other ejection means for expelling the partially reacted liquid.

In practicing the invention, a large cavity is filled with solidified polyurethane foam by mixing the components of a polyurethane plastic together in any suitable mixing device and the resulting mixture is then transferred to a chamber where the components begin to react together. The point in the chemical reaction where the desired amount of chemical reaction is obtained is determined by measuring the temperature of the reaction liquid. A piston housed in the chamber is actuated by a temperature responsive device when the predetermined temperature is reached and the reaction liquid is ejected into the cavity. The volume of liquid ejected is sufficient to fill the cavity, thereby avoiding the necessity of adding freshly mixed liquid components to the cavity. The partially reacted mixture becomes creamy as it is ejected because of the drop in pressure on the liquid outside the discharge opening.

The invention contemplates a combined mixing chamber and ejection chamber in one unit as well as a combination of a separate mixing device and reaction chamber having an ejection piston. When separate mixing and ejection chambers are used, any suitable mixing device may be used, but it is preferred to use a device wherein at least the catalyst is injected into the more viscous organic compound having reactive hydrogen atoms or a prepolymer or adduct formed by reacting such a compound with a polyisocyanate.

As stated above, the time for the ejection of the creamy liquid from the chamber is controlled by means of a temperature-measuring instrument. The apparatus for carrying the process into effect advantageously has a cylinder provided with an ejection piston, the cylinder being in communication at one end with a mixing device for producing the mixture of foam material and at the other end with the cavity which is to be filled. Before the reaction mixture is transferred to the cavity, it is permitted to dwell in the transition chamber or cylinder, the duration of this period being dependent on the nature of the mixture, so that the required creamy foam structure of the mixture is produced before the piston is actuated. The mixture, which has still not commenced to react, transferred from a mixing device to the chamber, does not completely fill the given cylinder space initially, so that expansion of the mixture is possible as the reaction progresses.

With the start of the chemical reaction between the components of the mixture in the cylinder, the temperature of the mixture rises, this rise depending on the nature of the mixture; for example, for a hard polyurethane foam mixture prepared from about 100 parts by weight of a polyester produced from about 5 mols of adipic acid, about 1 mol of phthalic anhydride and about 8 mols of hexanetriol, about 2 parts by weight of silica aerogel, about 1 part by weight of hexahydrodimethyl aniline, about 3 parts by weight of a sulfonated castor oil containing about 54% water and about 85 parts by weight of toluylene diisocyanate, the temperature rises from about 20° C. to about 80° C. within about 2 seconds. When the required reaction temperature of, for example, about 70° C. is reached, the contact thermometer on the piston head responds and sets the piston drive in operation through a relay. With the ejection, because of the relief of pressure of the mixture at the outlet opening from the cylinder to the cavity, the mixture is suddenly given a creamy structure which is necessary for filling the cavity with foam.

The mixing device for producing the foam mixture may be a cylinder having an ejection piston therein which is provided with an annular transverse groove communicating with vertical bores through which the supply of components injected into the annular groove move into the cylinder space, while inlet openings for the supply of the other reactants are provided in the wall of the cylinder. This cylinder, in which the mixing of the components takes place thus serves as both a mixing chamber and the transition chamber in which the reaction of the mixture proceeds before the mixture is expelled into the molds or hollow bodies. Any suitable temperature responsive means can be used in the apparatus for carrying the process into effect, for instance, contact thermometers, bimetallic stripes or other corresponding means known per se. When the desired temperature has been reached the piston is actuated by any suitable means, such as a motor or a hydraulic device responsive to the temperature control apparatus.

Embodiments of the apparatus for carrying the process into effect are shown diagrammatically and by way of example in the drawing.

Referring to FIGURE 1, the reference 1 represents the hollow body to be filled with foam, 2 is the cylinder and 3 the ejection piston. Connected to the cylinder space 2 is the portable nozzle mixing head 4, in which the mixing of the separate components is carried out; 5 and 6 represent valves; 7 represents a contact thermometer arranged on the piston head. The introduction of the reactive mixture into the cylinder 2 is effected by means of the mixing head 4 by way of the valve 5, which valve is closed after the weight of thinly liquid mixture necessary for filling the hollow body with foam has been introduced into the cylinder 2. The thinly liquid reactive mixture, which only partially fills the cylinder 2, remains a certain length of time in the cylinder, reacts with a rise in temperature and is given the necessary foamy structure and increase in volume during the reaction. After the necessary reaction temperature is reached, the contact thermometer 7, set for this predetermined temperature, responds and initiates the piston-ejection operation. After the hollow body 1 has been filled, the valve 6 is closed again, the piston 3 moves downward again and the valve 5 is re-opened for a fresh supply of reactive mixture from the mixing head 4.

The mixing and reaction device according to FIGURE 2 consists of a cylinder 8, in which a piston 9 is moved up and down by means of the hydraulically driven piston 10. The piston 9 is provided with a transverse groove 12, from which start bores 11 opening into the cylinder space. Pipes 13 and 14 for the supply of the reactants open into the inside wall of the cylinder 8. Arranged in the cylinder head is a contact thermometer 15. The positions of the pipes 13 and 14 are shown in FIGURE 3. In the lower dead position of the piston 9, one reactant, for example, polyester, is introduced into the annular groove 12 under pressure through the pipe 13 and is forced through the bores 11 into the cylinder space above the piston, and at the same time the other reaction components, for example, polyisocyanate, accelerator and/or cross-linking agent, are injected through the pipes 14 into the cylinder space transversely of the jets leaving the bores 11, these other reactants entering these streams of polyester and being mixed therewith. The thin reactive mixture remains in the cylinder until it has reached the necessary reaction temperature and is then expelled into the interior of the hollow body 1 by means of the piston after the valve 6 has opened.

The apparatus provided by this invention may be used in filling cavities with cellular polyurethanes prepared from any suitable mixture of components, the invention residing in the apparatus and process and not in the chemical composition of the reaction mixture. The reaction mixture may contain a polyester, a polyalkylene ether, a polythioether, a polyesteramide or any other suitable organic compound having reactive hydrogen atoms, any suitable polyisocyanate, any suitable catalyst or accelerator and any suitable chain-extender or cross-linker. Suitable reaction mixtures and components for making such mixtures are disclosed in the aforesaid Hoppe et al. patent.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. An apparatus comprising a chamber, a piston in said chamber occupying only a portion thereof, means for moving the piston from one end of the chamber towards the opposite end thereof, said piston having a diameter substantially equal to the internal diameter of the chamber and having one end opposite the first-said end of the chamber, an annular groove in said piston, a plurality of bores extending from said annular groove and communicating with the unoccupied space in said chamber, means for introducing liquids into said groove and forcing them through said bores into the unoccupied space in the chamber, a temperature measuring means in said unoccupied space of the chamber, means for actuating said piston actuation of the piston being initiated by said temperature measuring means and means through which said liquid is forced from said chamber as said piston moves from one end towards the opposite end.

2. An apparatus adapted for filling cavities with a polyurethane plastic comprising means for mixing liquid components together which will react to form a solid polyurethane plastic, means for transferring the resulting mixture while it is still liquid to a storage means, said storage means comprising a chamber, a piston in said chamber adapted to be moved longitudinally back and forth in the chamber, said piston having a diameter substantially equal to the internal diameter of the chamber, means in said chamber for measuring the temperature of the said mixture, means for moving the piston back and forth in the chamber, actuation of the last said means being initiated by said temperature measuring means whereby said piston expels the said liquid reaction mixture from the chamber when the reaction mixture reaches a predetermined temperature.

References Cited in the file of this patent

UNITED STATES PATENTS

| | | |
|---|---|---|
| 523,797 | Leonhardt | July 31, 1894 |
| 1,339,712 | Pauly | May 11, 1920 |
| 2,166,437 | Howie et al. | July 18, 1939 |
| 2,207,426 | Bailey | July 9, 1940 |
| 2,307,055 | Menger et al. | Jan. 5, 1943 |
| 2,437,704 | Moncrieff | Mar. 16, 1948 |
| 2,515,250 | McIntire | July 18, 1950 |
| 2,680,880 | Cobett | June 15, 1954 |
| 2,704,380 | Cuzzi | Mar. 22, 1955 |
| 2,764,565 | Hoppe et al. | Sept. 25, 1956 |
| 2,770,241 | Winkler | Nov. 13, 1956 |
| 2,885,268 | Breer et al. | May 5, 1959 |